(12) United States Patent
Dymetman et al.

(10) Patent No.: US 7,383,171 B2
(45) Date of Patent: Jun. 3, 2008

(54) SEMANTIC STENOGRAPHY USING SHORT NOTE INPUT DATA

(75) Inventors: Marc Dymetman, Grenoble (FR);
Caroline Brun, Grenoble (FR);
Aurelien Max, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 929 days.

(21) Appl. No.: 10/727,614

(22) Filed: Dec. 5, 2003

(65) Prior Publication Data

US 2005/0125219 A1    Jun. 9, 2005

(51) Int. Cl.
*G06F 17/27* (2006.01)

(52) U.S. Cl. .......................................................... 704/9
(58) Field of Classification Search ...................... 704/9
See application file for complete search history.

(56) References Cited

U.S. PATENT DOCUMENTS

| | | | |
|---|---|---|---|
| 4,041,467 A | 8/1977 | Cota et al. | |
| 4,566,065 A | 1/1986 | Toth | |
| 4,632,578 A | 12/1986 | Cuff et al. | |
| 4,858,170 A | 8/1989 | DeWick, Sr. et al. | |
| 4,893,238 A | 1/1990 | Venema | |
| RE33,337 E | 9/1990 | Lefler et al. | |
| 5,280,573 A * | 1/1994 | Kuga et al. ................. | 715/708 |
| 5,307,266 A * | 4/1994 | Hayashi et al. ............. | 715/531 |
| 5,426,583 A | 6/1995 | Uribe-Echebarria Diaz De Mendibil | |
| 5,466,072 A | 11/1995 | McCready | |
| 5,477,451 A | 12/1995 | Brown et al. | |
| 5,523,945 A * | 6/1996 | Satoh et al. ................... | 704/9 |
| 5,606,498 A | 2/1997 | Maruta et al. | |
| 5,873,107 A * | 2/1999 | Borovoy et al. ......... | 715/501.1 |
| 5,991,711 A | 11/1999 | Seno et al. | |
| 6,041,292 A | 3/2000 | Jochim | |
| 6,091,956 A | 7/2000 | Hollenberg | |
| 6,269,329 B1 * | 7/2001 | Nordstrom ..................... | 704/1 |
| 6,345,243 B1 | 2/2002 | Clark | |
| 6,349,203 B1 | 2/2002 | Asaoka et al. | |
| 6,424,829 B1 | 7/2002 | Kraft | |
| 2002/0010574 A1 * | 1/2002 | Tsourikov et al. ............. | 704/9 |
| 2002/0089470 A1 | 7/2002 | Raman et al. | |

FOREIGN PATENT DOCUMENTS

| | | |
|---|---|---|
| EP | 0610151 A1 | 8/1994 |
| JP | A-1-222367 | 9/1989 |
| WO | WO 93/22733 | 11/1993 |
| WO | WO 95/17729 | 6/1995 |

OTHER PUBLICATIONS

M. Dalrymple et al., "Tools for Morphological Analysis", *Center for the Study of Languages and Information*, Report No. CSLI-87-108, Sep. 1987.

(Continued)

*Primary Examiner*—David Hudspeth
*Assistant Examiner*—Justin W Rider
(74) *Attorney, Agent, or Firm*—Oliff & Berridge, PLC

(57) ABSTRACT

A method and apparatus converts input data such as short notes into a global text realization to provide semantically-coherent grammatical text. In various exemplary embodiments, an individual inputs short notes into a computer system, the computer system associates local text realizations with the short notes. Subsequently, the user may select the appropriate local text realizations, which may be converted to semantic representations and to semantically coherent grammatical text or a global text realization.

21 Claims, 8 Drawing Sheets

OTHER PUBLICATIONS

Lyucho User's Guide, Fuji Xerox, pp. 42-82.

"New Lyucho CF includes Sign Language" and "New Ads for Able Series".

I. Melcuk et al., "A Formal Lexicon in the Meaning-Text Theory (or How to Do Lexica with Words),", *Computational Linguistics*, vol. 13, Nos. 3-4, Jul.-Dec. 1987, pp. 261-275.

G. Miller, "WordNet: A Lexical Database for English," *Communications of the ACM*, vol. 38, No. 11, Nov. 1995, pp. 39-41.

J. Coch, "Evaluating and Comparing Three-Text Production Techniques", Proceedings COLING, pp. 249-254 (1996).

A. Ranta, "A Functional Framework for Grammars," 1998.

A. Ranta, "Grammatical Framework Implementation and Interfaces," 1999.

A. Ranta, "Grammatical Framework Syntax and Semantics," 1999.

A. Ranta, "Grammatical Framework Tutorial," 1999.

B. Baker, "Semantic Compaction for Sub-Sentence Vocabulary Units Compared to Other Encoding and Prediction Systems", *Minspeak Corporation*., In Proceedings of the 10th Conference on Rehabilitation Technology, pp. 118-120, RESNA, San Jose, CA (1984).

A. Carlberger et al., "Profet, A New Generation of Word Prediction: An Evaluation Study", pp. 23-28, 1997.

R. Power et al. , "Multilingual Authoring Using Feedback Texts", *Computational Linguistics*, pp. 1053-1059, 1998.

R. Power et al., "Multilingual Authoring Using Feedback Texts", *Information Technology Research Institute Technical Report Series*, pp. 1053-1059, Aug. 1998.

A. Max, "Reversing Controlled Document Authoring to Normalize Documents", in the Proceedings of the EACL'03 Student Research Workshop, Budapest, Hungary, 2003, pp. 33-40.

A. Max et al., "Document Content Analysis Through Inverted Generation", in AAAI 2002 Spring Symposium on Using (and Acquiring) Linguistic (and World) Knowledge for Information Access, Stanford University, US, pp. 33-40, 2002.

M. Dymetman et al. , "XML and Multilingual Document Authoring: Convergent Trends"., in Proceedings COLING 2000, pp. 243-249, Saarbrücken, Aug. 2000.

C. Brun et al., "Document Structure and Multilingual Authoring", Proceedings of First International Conference on Language Generation, (INGL'2000), Mitzpe Ramon Israël, 2000.

Game Commander, Product Q&A, http://www.gamecommander.com/products/pfaq.html, Jun. 2003, p. 1-4.

D. Rosenthal et al., Voice-Enabled, Structured Medical Reporting, Jan./Feb. 1998 (vol. 13, No. 1) web page summary (one page).

D. Rosenthal et al., Voice-Enabled, Structured Medical Reporting, Jan./Feb. 1998 (vol. 13, No. 1) p. 70-73.

*Windi Translation Help Manual*, Helios Editions, Belgium.

A. Ranta, "Grammatical Framework: A Type-Theoretical Grammar Formalism", *Department of Computing Science*, pp. 1-41, 2003.

Foster et al., TransType: Text Prediction for Translators, RALI, Université de Montréal, (2002).

U.S. Appl. No. 10/739,178, filed Dec. 19, 2003.

Christopher D. Manning and Hinrich Schütze, Foundations of Statistical Natural Language Processing, Chapter 15, MIT Press 1999.

Matt Ginnsberg, Essentials of Artificial Intelligence, Chapter 4, Morgan Kaufmann, 1993.

U.S. Appl. No. 10/065,443 "System for Learning a Language" filed Oct. 18, 2002.

* cited by examiner

| FILE | EDIT | FORMAT —— 205 | |
|---|---|---|---|

HERE IS THE UNDERSTANDING OF YOUR INPUT DATA. ← 210
PLEASE CORRECT ANY MISTAKES. PLEASE VALIDATE. — 250
230     220

| | | |
|---|---|---|
| admin assistant 231 | 251a → The job offer is for an administrative assistant<br>Other | 251 |
| GlobalModest 232 | The hiring company's name is GlobalModest<br>Other | 252 |
| Laval 233 | 253a → The job location is Laval, Quebec<br>253b → The job location is Laval, France ←<br>253c → Other | 253 |
| cdd 234 | The contract type is a CDD<br>Other | 254 |
| 1 year 235 | The contract duration is for 1 year<br>Other | 255 |
| immediate 236 | The position is to be filled immediately<br>Other | 256 |
| appointments 237 | The job involves handling appointments<br>Other | 257 |
| telephone 238 | The job involves answering the telephone<br>Other | 258 |
| simple letters 239 | The job involves preparing routine letters<br>Other | 259 |
| filing system 240 | The job involves creating a filing system<br>The job involves organizing and maintaining the filing system ←<br>Other | 260 |
| misc 241 | The job involves other miscellaneous tasks<br>Other | 261 |
| bac+2 242 | At least a bac+2 level is required<br>Other | 262 |
| 2 years experience 243 | At least 2 years of previous experience are required<br>Other | 263 |
| Word 244 | 264a → Excellent skills in Word are required<br>264b → Experience with Word is required<br>264c → Excellent skills in Word are desirable<br>264d → Experience with Word is desirable<br>264e → Other | 264 |
| Outlook 245 | Excellent skills in Outlook are required<br>Experience with Outlook is required<br>Excellent skills in Outlook are desirable<br>Experience with Outlook is desirable<br>Other | 265 |
| French 246 | Fluent knowledge of French is required<br>Knowledge of French would be desirable<br>Other | 266 |
| English 247 | Fluent knowledge of English is required<br>Knowledge of English would be desirable<br>Other | 267 |
| Italian plus 248 | Fluent knowledge of Italian would be desirable<br>Knowledge of Italian would be desirable ←<br>Fluent knowledge of Italian is required<br>Knowledge of Italian is required<br>Other | 268 |

| FILE | EDIT | FORMAT ← 205 | |
|---|---|---|---|
| HERE IS THE UNDERSTANDING OF YOUR INPUT DATA. ← 210 |||||
| PLEASE CORRECT ANY MISTAKES. PLEASE VALIDATE. — 250 |||||

| 230 | 220 |
|---|---|
| *admin assistant* | The job offer is for an administrative assistant<br>Other |
| *GlobalModest* | The hiring company's name is GlobalModest<br>Other |
| *Laval* | The job location is Laval, Quebec<br>The job location is Laval, France<br>Other |
| *cdd* | The contract type is a CDD<br>Other |
| *1 year* | The contract duration is for 1 year<br>Other |
| *immediate* | The position is to be filled immediately<br>Other |
| *appointments* | The job involves handling appointments<br>Other |
| *telephone* | The job involves answering the telephone<br>Other |
| *simple letters* | The job involves preparing routine letters<br>Other |
| *filing system* | The job involves creating a filing system<br>The job involves organizing and maintaining the filing system<br>Other |
| *misc* | The job involves other miscellaneous tasks<br>Other |
| *bac+2* | At least a bac+2 level is required<br>Other |
| *2 years experience* | At least 2 years of previous experience are required<br>Other |
| *Word* | Excellent skills in Word are required<br>Experience with Word is required<br>Excellent skills in Word are desirable<br>Experience with Word is desirable<br>Other |
| *Outlook* | Excellent skills in Outlook are required<br>Experience with Outlook is required<br>Excellent skills in Outlook are desirable<br>Experience with Outlook is desirable<br>Other |
| *French* | Fluent knowledge of French is required<br>Knowledge of French would be desirable<br>Other |
| *English* | Fluent knowledge of English is required<br>Knowledge of English would be desirable<br>Other |
| *Italian plus* | Fluent knowledge of Italian would be desirable<br>Knowledge of Italian would be desirable<br>Fluent knowledge of Italian is required<br>Knowledge of Italian is required<br>Other |

SEMANTIC STENOGRAPHY USING SHORT NOTE INPUT DATA

BACKGROUND OF THE INVENTION

1. Field of Invention

This invention relates to semantic stenography including automatically converting short notes to semantically-coherent grammatical text.

2. Description of Related Art

Students, professionals, pollsters, and employees of call centers or customer service centers often do not have enough time to write down complete, well-formed sentences to describe information communicated orally to them. Instead, it is common for such individuals to jot down a few key words or short notes that convey the essential facts as the conversation, lecture or other oral interaction progresses. Stenography is the art or process of taking short hand during an oral communication and later converting the short hand notes into a full written text or transcript of the oral communication.

It is often desirable to speed up the process of converting short hand into full written text, so that the oral communication can be recorded or published quickly. For example, U.S. Patent Application Publication No. 2002/0089470 A1 discloses a real time internet transcript presentation system, which produces a real-time transcript of a live presentation. However, converting oral communication into a transcript often does not result in well-formed sentences. In addition, these real-time transcription systems only provide raw information. These real-time transcription systems do not summarize information in condensed, semantically-coherent grammatical text or well-formed sentences to quickly and efficiently communicate information to an audience or community.

In addition, being able to generate the notes in the first instance depends on conventions that associate complex conceptual constructions with what could be called "semantic abbreviations." These conventions are often shared by communities. The tighter the community and the more frequent the need to communicate recurring types of information, the more efficient such coding becomes.

SUMMARY OF THE INVENTION

The conventional real-time transcription systems can not efficiently communicate recurring types of information, because these systems receive raw information and directly convert the received raw information into text. These conventional real-time transcription systems do not recognize recurring information and all of the conventions. Therefore, being able to convert short notes into complete grammatical texts, so that individuals receive a complete textual summary in concise, well-formed sentences of information communicated orally, would be desirable.

Another technique is in the field of Controlled Document Authoring. Typically, the user of these systems selects possible semantic choices in active fields present in the evolving text of the document in a user's language. These selections iteratively refine the document content until it is complete. Then, the system may translate the document into multiple languages. One such type of controlled document authoring system is the multilingual document authoring (MDA) system as discussed in "Document Structure and Multilingual Text Authoring" by Caroline Brun, Marc Dymetman and Veronika Lux in the Proceedings of First International Conference on Natural Language Generation (INLG'2000), Mitzpe Ramon, Israël, 2000; in "Reversing Controlled Document Authoring to Normalize Documents" by Aurélien Max (Max) in the Proceedings of the EACL'03 Student Research Workshop, Budapest, Hungary, 2003; and in "Document Content Analysis through Inverted Generation," in AAAI 2002 Spring Symposium on Using (and Acquiring) Linguistic (and World) Knowledge for Information Access, Stanford University, United States, 2002 by Aurélien Max and Marc Dymetman (Max and Dymetman), each of which is incorporated by reference herein in its entirety.

These multilingual document authoring systems discussed above rely on a formal mechanism (a kind of unification grammar) to describe well-formed semantic representations and their textual realizations in several languages or writing styles. These specifications are restricted to specific domains of discourse for which a relatively complete modeling of document content is possible, such as pharmaceutical leaflets, experimental reports, classified adds, etc. Such specifications can also be used as enumeration mechanisms, which deterministically generate well-formed semantic representations along with their global textual realizations. However, in these multilingual document authoring systems, global text realizations are generated by asking a user to respond to questions through menu selections associated with different possible paths in an enumeration process. This is discussed in "Document Structure and Multilingual Text Authoring" by Caroline Brun, Marc Dymetman and Veronika Lux in the Proceedings of First International Conference on Natural Language Generation (INLG'2000), Mitzpe Ramon, Israël, 2000, (Brun, Dymetman and Lux), which is incorporated herein by reference in its entirety.

However, such multilingual document authoring systems require a user to select active fields on a display screen to complete a grammatical sentence. The sentences or phrases containing active fields appear in a specific order. These active fields have a fixed number of choices, which depend upon the previous selections. During a conversation, lecture or other oral interaction, the speaker, e.g., a customer who is speaking with a customer service representative, may not make statements in the same order as they appear on the graphical user interface of the multilingual document authoring system. The user may not be able to select the appropriate active field and/or the parameters in the active fields may be too limited.

This invention provides systems and methods for converting input data into semantically-coherent grammatical text.

This invention separately provides systems and methods for analyzing input data and associating input data with other data.

This invention separately provides systems and methods for associating input data with stored data.

This invention separately provides systems and methods for generating a global text realization based on the association of input data and other data, such as stored data. The other data may include local text realizations.

This invention separately provides computer program products having a computer usable medium having computer readable program code for converting short notes into global text realization.

In various exemplary embodiments of the systems and methods according to this invention, short notes or keywords are converted into semantically-coherent grammatical text. The short notes or keywords may be meaningful to an audience or community, and may contain semantic abbreviations, which can be used to form semantically-coherent grammatical text. The short notes and/or semantically-coherent text may be outputted to an output device such as a display device, printing device, sound device, or the like.

In various exemplary embodiments, global text realizations are generated by performing a fuzzy match between a plurality of local text realizations and short notes to provide at least one local text realization in association with each short note.

In various exemplary embodiments, short notes are output with at least one local text realization associated therewith.

In various exemplary embodiments, one of the local text realizations associated with each short note is selected and a global text realization based on the selected short note is generated.

In various exemplary embodiments, a global text realization is generated based on the semantic representation for each selected associated text realization.

In various exemplary embodiments, a semantic representation is determined for each selected associated text realization by validating each local text realization, retrieving associated semantic representations and generating a global text realization based on the semantic representations.

In various exemplary embodiments, a fuzzy match is performed between a plurality of local text realizations and short notes to provide at least one local text realization in association with each short note in which a rank is assigned to each local text realization associated with each short note. The local text realizations can be outputted in accordance with an assigned rank for each local text realization.

In various exemplary embodiments, a fuzzy match is performed between a plurality of local text realizations and short notes to provide at least one local text realization in association with each short note including determining a descriptor for each short note, providing descriptors for each local text realization, determining the fuzzy similarity measure between descriptors for short notes and descriptors for local text realization, and ranking descriptors based on fuzzy similarity measure for outputting of local text realization associated with descriptors.

This invention provides systems and methods for processing input data to provide global text realizations.

This invention provides systems and methods for using a semantic grammar to generate semantic structures.

This invention separately provides systems and methods for producing with a first realization grammar a plurality of local text realizations from the semantic structures.

This invention separately provides systems and methods for matching received short note input data with instances of the plurality of local text realizations to define a final semantic structure.

This invention substantively provides systems and methods for producing with a second realization grammar a global text realization from the final semantic structure.

These and other features and advantages of various exemplary embodiments of systems and methods according to this invention are described in, or are apparent from, the following detailed description of various exemplary embodiments of the systems and methods according to this invention.

BRIEF DESCRIPTION OF THE DRAWINGS

Various exemplary embodiments of this invention will be described in detail, with reference to the following Figures, wherein:

FIG. 7 is one exemplary embodiment of a graphical user interface showing one or more local text realizations associated with each short note;

FIG. 8 is one exemplary embodiment of a graphical user interface showing a selected local text realization associated with each short note;

DETAILED DESCRIPTION OF EXEMPLARY EMBODIMENTS

Figure 1:
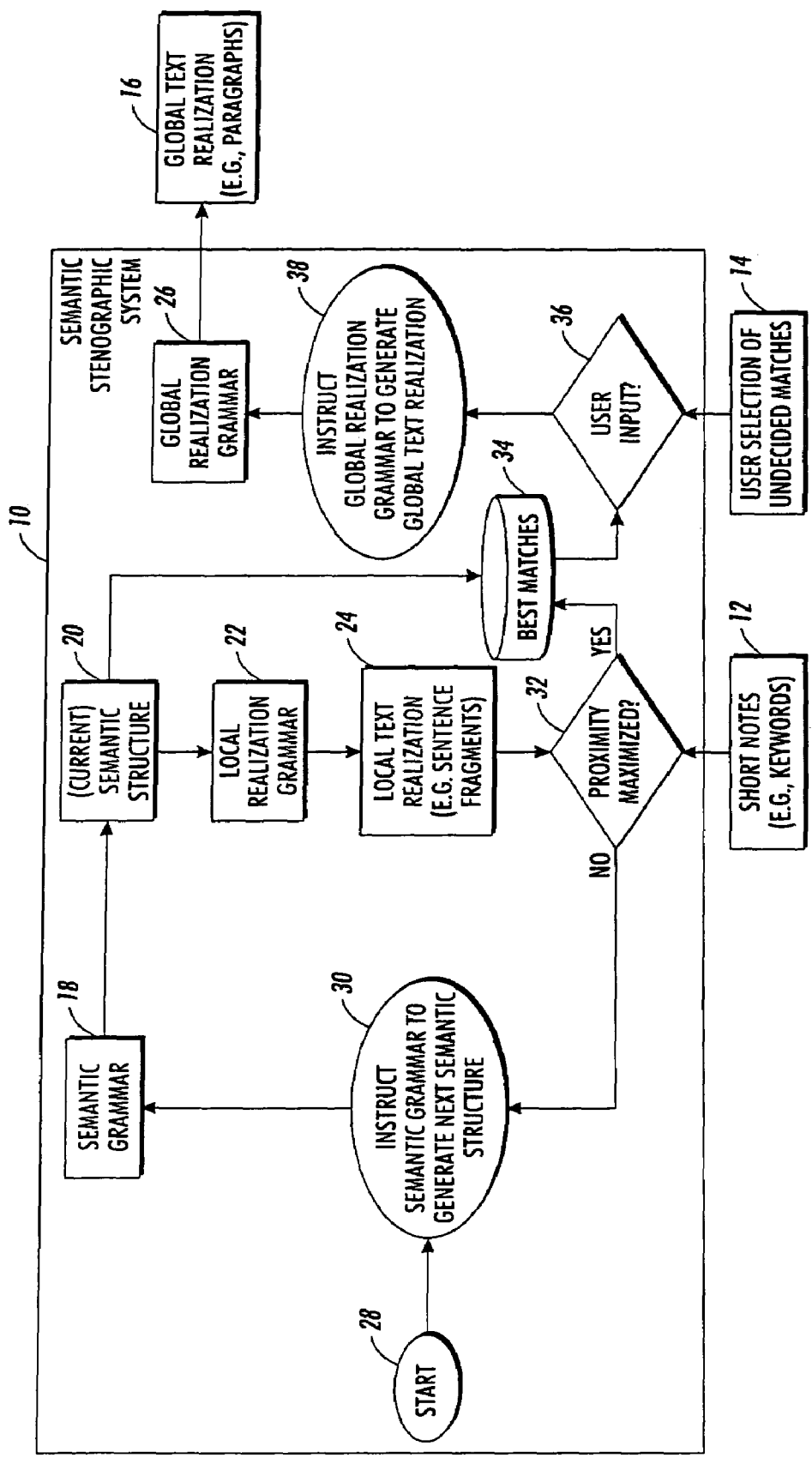
FIG. 1 is one exemplary embodiment of a semantic stenographic system for performing semantic stenography.

FIG. 1 illustrates a semantic stenographic system 10 for performing semantic stenography in accordance with one embodiment of the present invention. The semantic stenographic system operates on any computational device adapted to execute instructions that operate in accordance with various methods for operating the system. The method for operating the embodiment in FIG. 1 is non-deterministic. In alternate embodiments, optimization is performed using admissible search techniques as disclosed in "Reversing Controlled Document Authoring to Normalize Documents" by Aurélien Max (Max) in the Proceedings of the EACL'03 Student Research Workshop, Budapest, Hungary, 2003. More specifically, FIG. 1 illustrates a conceptual view of the semantic stenographic system 10 in which a user provides short notes 12 as input to the system and optionally user input 14. Each short note comprises one or more keywords, where each keyword may be a grouping of two or more keywords. As output, the semantic stenographic system 10 provides global text realization 16 which represent well formed paragraphs related to the short notes 12 that are not linguistically well formed. For instance, the leftmost column of Table 1 below sets forth an example of short notes 12, and the rightmost column of Table 2 sets forth an example of global text realization 16.

TABLE 1

| Short Note | Local Text Realization | Semantic Representation |
|---|---|---|
| admin assistant | The job offer is for an administrative assistant | <job_offer><br>  <job_description> administrative_assistant<br>  </job_description> |

TABLE 1-continued

| Short Note | Local Text Realization | Semantic Representation |
|---|---|---|
| GlobalModest | The hiring company's name is GlobalModest | <company> GlobalModest </company> |
| Laval | The job location is Laval, France | <job_location> laval_france <job_location> |
| Cdd | The contract type is a CDD | <contract_type> cdd </contract_type> |
| 1 year | The contract duration is for 1 year | <contract_duration> one_year </contract_duration> |
| immediate | The position is to be filled immediately | <starting_date> immediate <starting_date> |
| | | <tasks> |
| appointments | The job involves handing appointments |   <task> appointments </task> |
| telephone | The job involves answering the telephone |   <task> telephone </task> |
| routine letters | The job involved preparing routine letters |   <task> write_routine_letters </task> |
| filing system | The job involves handling a filing system |   <task> filing_system_handle </task> |
| Misc | The job involves other miscellaneous tasks |   <task> misc_duties </task> |
| | | </tasks> |
| bac+2 | At least a bac+2 level is required | <study_level/> bac_plus2 <study_level> |
| 2 years experience | At least 2 years of previous experience are required | <experience_length> 2_years </experience_length> |
| | | <computer_skills> |
| Word | Excellent skills in Word are required |   <computer_skills> |
| | |     <cs_program> Word </cs_program> |
| | |     <cs_level> excellent </cs_level> |
| | |     <cs_requirement> required </cs_requirement> |
| | | <computer_skills> |
| Outlook | Excellent skills in Outlook are required |   <computer_skills> |
| | |     <cs_program> Outlook </cs_program> |
| | |     <cs_level> excellent </cs_level> |
| | |     <cs_requirement> required </cs_requirement> |
| | | <computer_skills> |
| | | <computer_skills> |
| | | <language_skills> |
| French | Fluent knowledge of French is required |   <language_skills> |
| | |     <ls_idiom> French </ls_idiom> |
| | |     <ls_level> fluent </ls_level> |
| | |     <ls_requirement> required </ls_requirement> |
| | | <language_skills> |
| | | <language_skills> |
| English | Fluent knowledge of English is required |   <language_skills> |
| | |     <ls_idiom> English </ls_idiom> |
| | |     <ls_level> fluent </ls_level> |
| | |     <ls_requirement> required </ls_requirement> |
| | | <language_skills> |
| | | <language_skills> |
| Italian plus | Knowledge of Italian would be desirable |   <language_skills> |
| | |     <ls_idiom> Italian </ls_idiom> |
| | |     <ls_level> good </ls_level> |
| | |     <ls_requirement> desirable </ls_requirement> |
| | | <language_skills> |
| | | <language_skills> |
| | | </job_offer> |

TABLE 2

| Semantic Representation | Global Text Realization |
|---|---|
| <job_offer><br>  <job_description> administrative_assistant <job_description><br>  <company> GlobalModest </company><br>  <job_location> laval_france </job_location><br>  <contract_type> cdd </contract_type><br>  <contract_duration> one_year </contract_duration><br>  <starting_date> immediate </starting_date><br><tasks><br>  <task> appointments </task><br>  <task> telephone </task><br>  <task>write routine letters </task><br>  <task>filing_system_handle </task><br>  <task>misc_duties </task><br><tasks><br><study_level> bac_plus_2 </study_level><br><experience_length> 2_years </experience_length><br>  <computer_skills><br>    <computer_skill><br>      <cs_program> Word </cs_program><br>      <cs_level> excellent </cs_level><br>        <cs_requirement> required </cs_requirement> | GlobalModest is looking for an Administrative Assistant for its Laval office in France.<br>The position is a CDD for one year to be filled immediately.<br><br>The main duties will be to schedule appointments, to answer the telephone, to prepare routine letters, to organize and maintain the filing system and to perform a variety of other miscellaneous duties.<br><br>The candidate should have a Bac+2 level, at least two years experience in a similar position and excellent skills in Word and Outlook. |

TABLE 2-continued

| Semantic Representation | Global Text Realization |
| --- | --- |
| <computer_skills><br>  <computer_skill><br>    <cs_program> Outlook </cs_program><br>    <cs_level> required </cs_level><br>      <cs_requirement> required </cs_requirement><br>  </computer_skills><br></computer_skills><br><language_skills><br>  <language_skill><br>    <ls_idiom> French </ls_idiom><br>    <ls_level> fluent </ls_level><br>    <ls_requirement> required </ls_requirement><br><language_skill><br><language_skill><br>  <ls_idiom> English </ls_idiom><br>    <ls_level> fluent </ls_level><br>    <ls_requirement> required </ls_requirement><br><language_skill><br><language_skill><br>  <ls_idiom> Italian</ls_idiom><br>    <ls_level> good </ls_level><br>    <ls_requirement> desirable </ls_requirement><br><language_skill><br><language_skilsl><br></job_offer> | Fluent knowledge of both French and English are required, with Italian a plus. |

To generate the global text realization 16 from the short notes 12, the system 10 makes use of a semantic grammar 18 that may be used to generate a collection of well-formed semantic structures 20, which said semantic structures may be for example represented in the form of a tree. The rightmost column of Table 1 shows an example of one of many possible representations of a semantic structure 20. A local realization grammar 22 may be used to produce local text realizations 24 from a semantic structure 20, and a global realization grammar 26 may be used to produce global text realizations 16. An example of local text realizations are shown in the middle column of Table 1. More generally, the semantic grammar 18 is made up of semantic grammar objects for enumerating semantic structures, and the local and global realization grammars 22 and 26 are made up of realization grammar objects for transforming semantic input into text that is either local (e.g., sentence fragments) or global (e.g., paragraphs), respectively.

Figure 2:
FIG. 2 is one functional black diagram illustrating the general order of data flow from short notes to global text realization.

FIG. 2 illustrates the general order in which data in Tables 1 and 2 are used by the system 10. Initially at A, semantic representations (from semantic structure 20 in FIG. 1) are used to produce local text realizations (shown in FIG. 1 at 24). At B, the text realizations are matched with short notes (shown in FIG. 1 at 12). At C, the matching local text realizations refer back to semantic representations that are used at D to produce global text realizations.

In operation, upon receiving input in the form of short notes 12, the system 10 initially at 28 instructs the semantic grammar 18 at 30 to generate a next (current) semantic structure 20. Once the current semantic structure 20 is generated, the local realization grammar 22 is instructed to generate a local text realization 24 using the current semantic structure 20. Subsequently at 32, the proximity between the local text realizations 24 and the short notes 12 is maximized at 32. In one embodiment, proximity maximization is achieved by generating at 30 different semantic structures 20 (having corresponding local text realizations 24) to identify and record best matches 34 that are a collection of local text realizations 24 and their corresponding semantic structures 20 that match most closely to the short notes 12. That is, as local text realizations 24 are identified at 32 to have a predetermined level of similarity with short notes 12, the local text realizations 24 are recorded as a best match 34 together with a reference to their semantic structure 20.

Once a sufficient level of match has taken place at 32 between local text realizations 24 and the short notes 12, input from a user may be requested at 36 to choose between different local text realizations that are similarly proximate to (i.e., have a similar degree of match with) one or more short notes. In the event multiple undecided matches are offered for selection by the user at 14 that depend on non-coherent semantic structures, the system 10 in one embodiment removes non-coherent semantic structures from those available to the user when local text realizations are selected at 36 that conflict. Once a final semantic structure is defined (which is defined when a user implicitly selects overall best matches at 14), a global text realization 16 is generated at 38 by applying the global realization grammar 26 to the final semantic structure.

Figure 3:
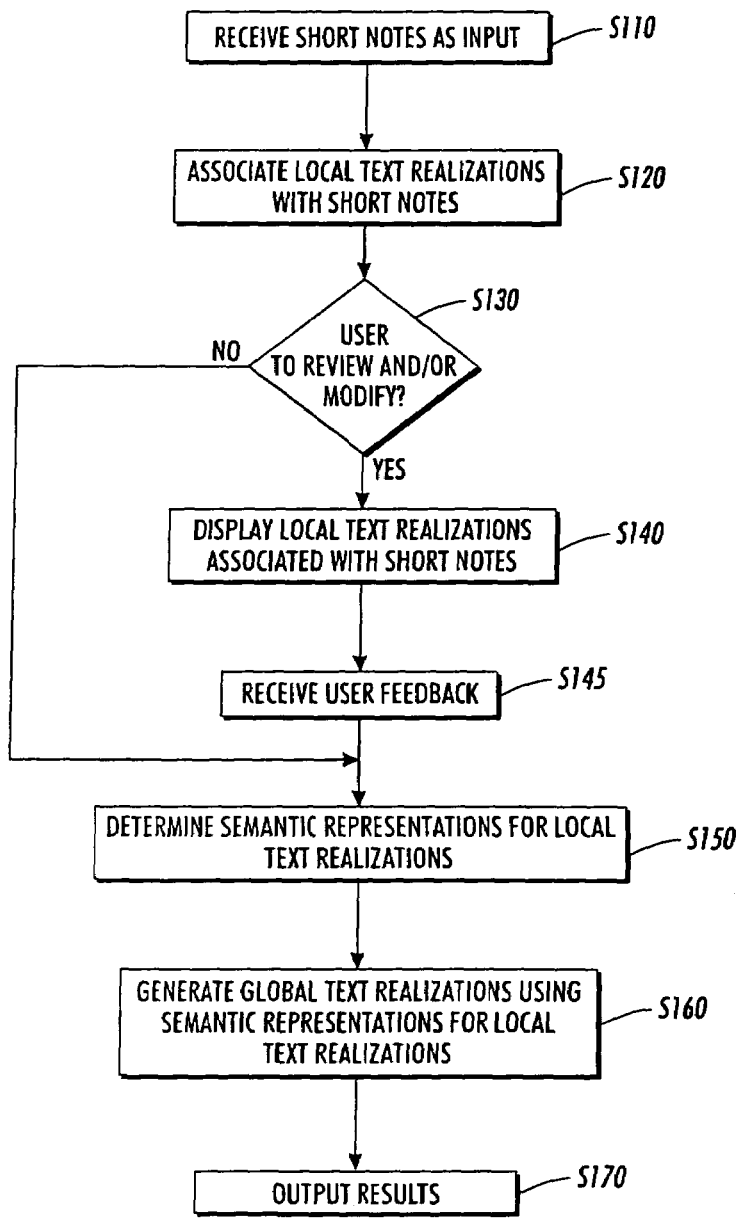
FIG. 3 is a flowchart outlining one exemplary embodiment of a method for converting notes into semantically-coherent grammatical text according to this invention.

FIG. 3 is a flowchart outlining an exemplary embodiment of a method for converting notes, which are meaningful inside a community (i.e., domain specific), into semantically-coherent grammatical text or a global text realization that is usable when communicating with a wider audience, that is not privy to the abbreviation conventions used in the community. The method for converting short notes to global text realization starts at step S110. In step S110, a user or operator inputs input data such as short notes into a computing device, which in exemplary embodiments, displays the short notes in a graphical user interface on a display screen. Control continues to step S120, where a fuzzy match between short notes and a list of local text realizations is performed to associate local text realizations with short notes. Next, in steps S130 and S140, the short notes are displayed with associated local text realizations for a user to review and/or modify if there are matches that are sufficiently close to require user input. Alternatively, if no user input is required, control advances to step S150. Preferably, the highest ranking potential local text realization is highlighted for the user or operator.

If user input is required control continues to step S145, where the user or operator selects the local text realizations, which are converted into semantic representations associated with the local text realizations in step S150. These semantic representations can be provided by the existing document authoring system. Next, in step S160, the global text realization associated with the semantic representations can be generated by the existing document authoring system. Next, in step S170, the process ends by outputting the global text realization (semantically-coherent grammatical text).

Figure 4:
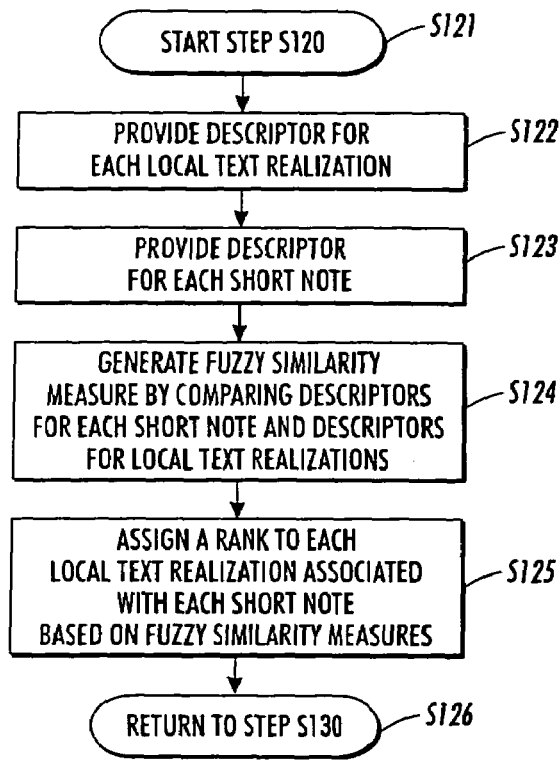
FIG. 4 is a flowchart outlining in greater detail one exemplary embodiment of the step of associating local text realizations with short notes.

FIG. 4 shows a flowchart outlining in greater detail the steps for associating local text realizations with short notes including performing a fuzzy match between a list of short notes and a list of local text realizations, for example, as set forth in step S120 in FIG. 3. The fuzzy match process starts at step S121 and continues to step S122. In step S122, a descriptor or semantic expression is provided for each local text realization. Control continues in step S123, where a descriptor or semantic expression is provided for each short note. A multilingual document authoring system or other controlled document authoring system may provide these descriptors or semantic expressions.

Control continues to step S124, where a fuzzy similarity measure is generated, for example, by comparing descriptors or semantic expressions for each short note with descriptors or semantic expressions of the local text realizations. This similarity may be provided by computing the semantic distance between a short note and any local realization. This can be done using known or hereafter developed techniques, for example those set forth in Christopher D. Manning and Hinrich Schüitze, Foundations of Statistical Natural Language Processing, Chapter 15, MIT Press 1999, which is incorporated herein by reference in its entirety.

For example, a descriptor is provided for each local text realization and each short note. By comparing the descriptors for each short note with the descriptors of the potential local text realizations, semantic distance between a short note and a potential local text realization is measured. This measure is used to determine the matches between a short note and all the potential local text realizations that have a similarity larger than some predefined threshold. In order the avoid searching the whole space of the possible local text realizations relative to the multilingual document authoring grammar or other controlled document authoring system grammar, a known or hereinafter developed technique of an admissible search, such as those set forth in Matt Ginsberg, Essentials of Artificial Intelligence, Chapter 4, Morgan Kaufmann, 1993, which is incorporated herein by reference in its entirety, can be utilized so that only a small number of the potential local text realizations will have above-threshold similarity with a particular short note. However, other short notes may also be used to reduce the number of potential local text realizations associated with each short note to a manageable number.

In addition to identifying a local text realization for each short note in step S124, a rank can be assigned to each potential local text realization based on the similarity measurement, as in step S125. In embodiments, the potential local text realizations associated with each short note are ranked from highest (most likely potential local text realization) to lowest (least likely potential local text realization). The process ends and control returns to step S130.

Figure 5:
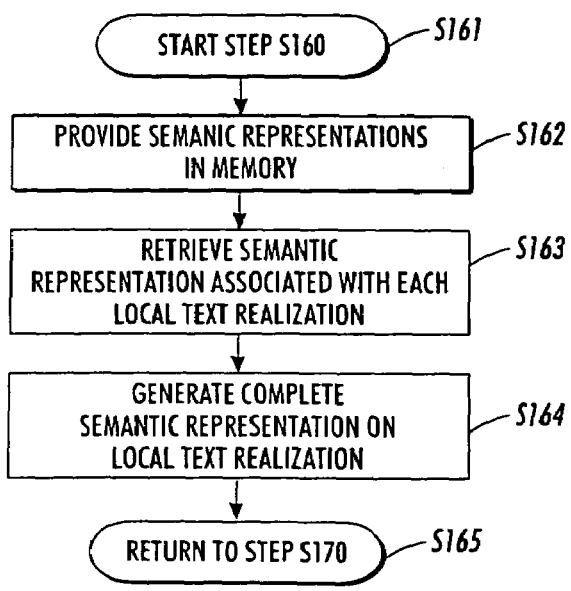
FIG. 5 is a flowchart outlining in greater detail one exemplary embodiment of the step of generating global text realizations using semantic representations for local text realizations.

FIG. 5 illustrates a flowchart outlining in greater detail the steps for determining a semantic representation associated with each selected local text realization, for example, as set forth in step S160 in FIG. 3. The process starts at step S161, and continues to step S162. In step S162, the semantic representations are provided for example, from memory. Control continues to step S163 where a semantic representation associated with each local text realization is retrieved. Next, in step S164, the complete semantic representation is generated based on the local text realization. These semantic representations can be provided by the existing multilingual document authoring system, so that a complete semantic representation based on the local text realization is generated, for example as shown in Tables 1 and 2. Alternatively, semantic representations can be provided by another controlled document authoring system or can be added. The process ends and control returns to step 170.

Figure 6:
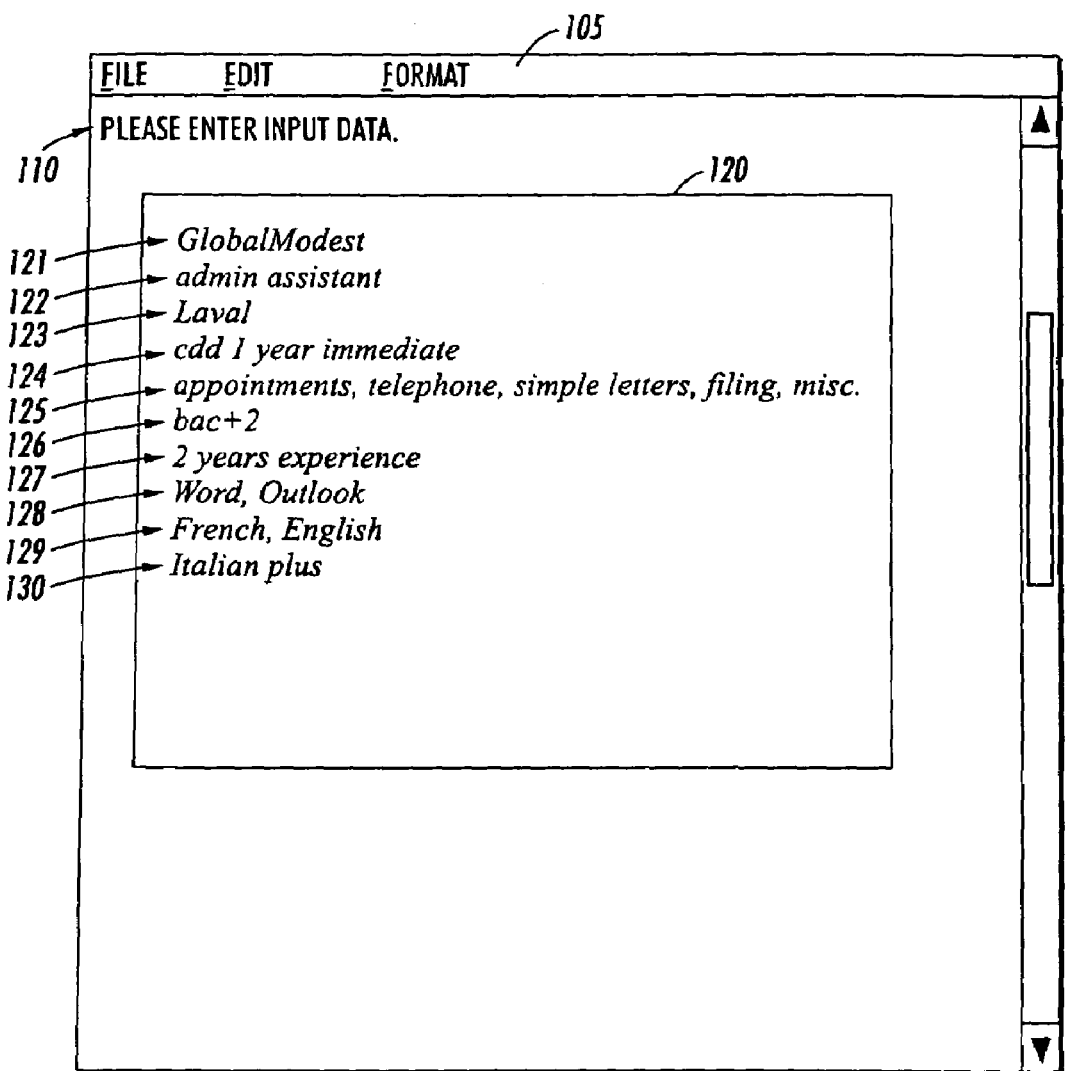
FIG. 6 is one exemplary embodiment of a graphical user interface showing short notes input by a user.

FIG. 6 shows an exemplary embodiment of a graphical user interface 100 including a tool bar 105, a request to enter input data 110, and a window 120 for displaying input data, such as short notes, input by a user or operator. These short notes may be referred to as keywords, which are understood to be meaningful to an audience or community. The number of short notes or keywords used by a community is unlimited, and the short notes or keywords may be input in any order. For example, in the community of job staffers or placement agencies, there are Internet placement agencies that have a call center where the Internet placement agency's employees receive phone calls from potential employers and post positions on a searchable Internet website. In accordance with various exemplary embodiments of this invention, a call center employee may input short notes or keywords that are then displayed by the graphical user interface 100 as shown in FIG. 6. Short notes or keywords may be entered using a variety of input devices, and may be displayed on an output device such as a display device.

In the exemplary embodiment of the community of job staffers or placement agencies, certain short notes or keywords are common in the industry, such as the name of the employer, the job title, the location of the position, the duration of employment, the duties of the position, the required or preferred education, the desired years of experience, the required computer software skills, the desired computer software skills, the required language skills, and the desired language skills. The order in which the short notes referring to job title, location of position, duration of employment, etc. are entered is not fixed or important. Further, the operator can input any number of short notes, because the matching will be performed based on the actual input data rather than based on a designated field or an order of entry.

The graphical user interface 100 includes a window 120 in which the exemplary short notes "GlobalModest" 121, "admin assistant" 122, "Laval" 123, "CDD 1 year immediate" 124, "appointments, telephone, simple letters, filing, misc." 125, "bac+2"126, "2 years experience" 127, "Word Outlook" 128, "French, English" 129, and "Italian plus" 130 are displayed.

After a user inputs the short notes or keywords, the short notes are associated with local text realizations. FIG. 7 illustrates an exemplary embodiment of a graphical user interface 200 having a toolbar 205, a request for an operator to validate a local text realization 210 based on a two column table 220 including a short note column 230 and a local text realization column 250. As shown in FIG. 7, short notes 231-248 correspond to local text realizations 251-268. Each short note is associated with one or more local text realizations, which are among the possible local text realizations generated by the document authoring system for the range of local semantic structures it is capable of expressing. For example, short note "admin assistant" 231 is associated with one local text realization in block 251, which is entitled "The job offer is for administrative assistant" 251*a*. A short note, such as "Laval" 233, may have more than one local text realization associated with the short note. As shown in block 253, two local text realizations "The job location is Laval, Quebec" 253*a* and "The job location is Laval, France" 253*b* are associated with the short note "Laval" 233. Each local text realization may be assigned a rank based upon a number of factors. These factors may include: similarity measures between the text of the note and the text of the local realization, frequencies of citing a given company, databases of cities along with their population statistics, and similar information. For example, the local text realization "The job location is Laval, Quebec" 253*a* is assigned a higher rank than the local text realization "The job location is Laval, France" 253*b* as shown by the order and highlighting of "The job location is Laval, Quebec" 253*a* in FIG. 2. However, the graphical user interface 200 permits the user to select the appropriate local text realization. If neither "The job location is Laval, Quebec" 253*a* nor "The job location is Laval, France" 253*b* is correct, the user or operator may select "other" 253*c* and input a desired local text realization.

FIG. 8 illustrates an exemplary embodiment in which the user or operator has completed his or her selection, for example, by highlighting the appropriate selection. Each local text realization is by construction associated with a local semantic representations relative to the authoring system as shown in Table 1 (rows of the table). Collectively these local semantic representations form a global semantic representation (last column of the Table 1).

After converting the local text realizations to a global semantic representation, as shown in Table 1, the document authoring system is called for generating a global text realization from this semantic representation. The result is shown in Table 2.

Figure 9:
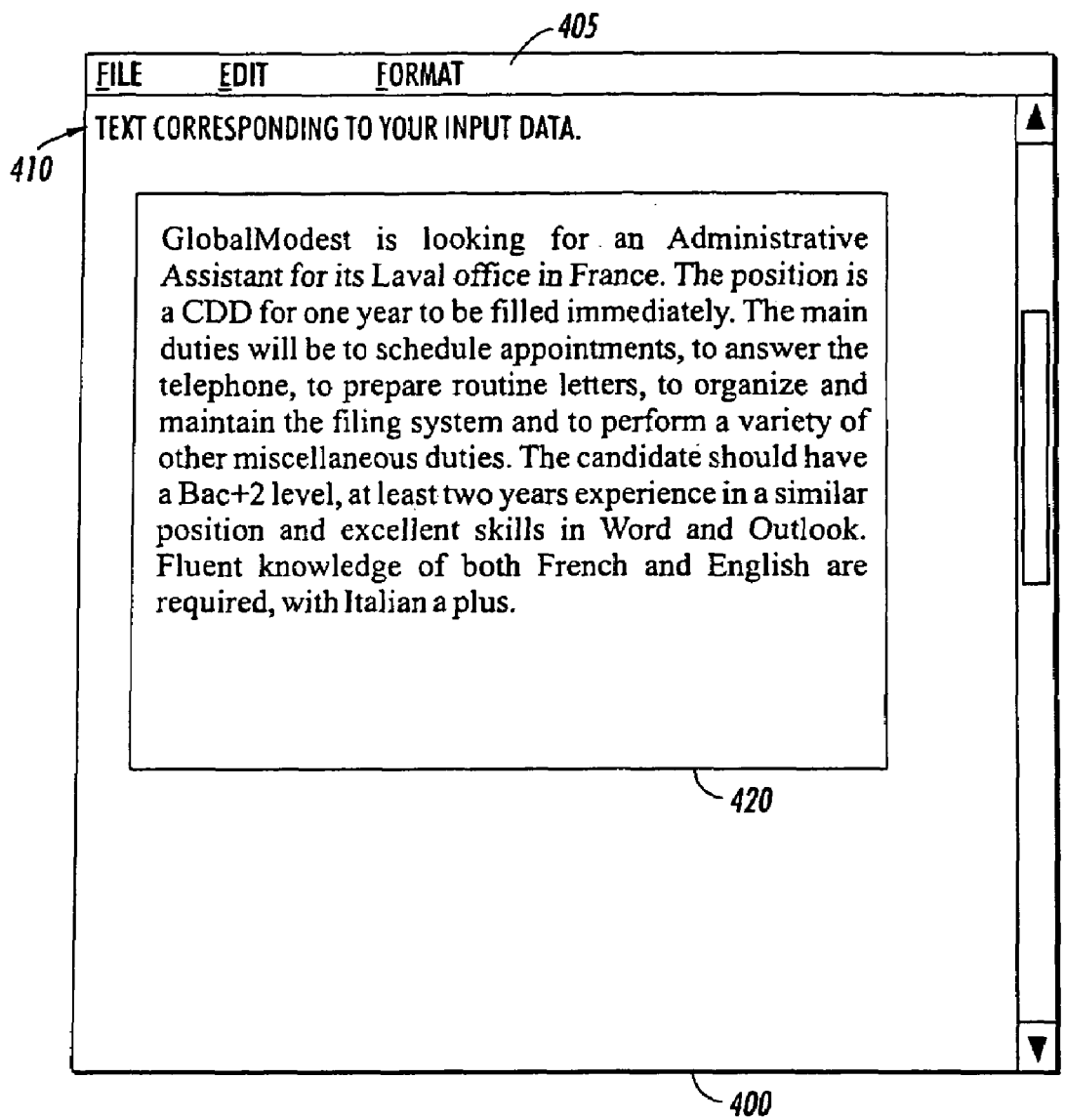
FIG. 9 is one exemplary embodiment according to this invention of a graphical user interface showing one exemplary global text realization or semantically-coherent grammatical text generated from the short notes and local text realizations.

FIG. 9 illustrates a graphical user interface 400 showing a toolbar 405, a heading 410 for identifying a window 420 that displays the global text realization 430 of the short notes input by the user or operator by applying the global realization grammar as discussed above.

Figure 10:
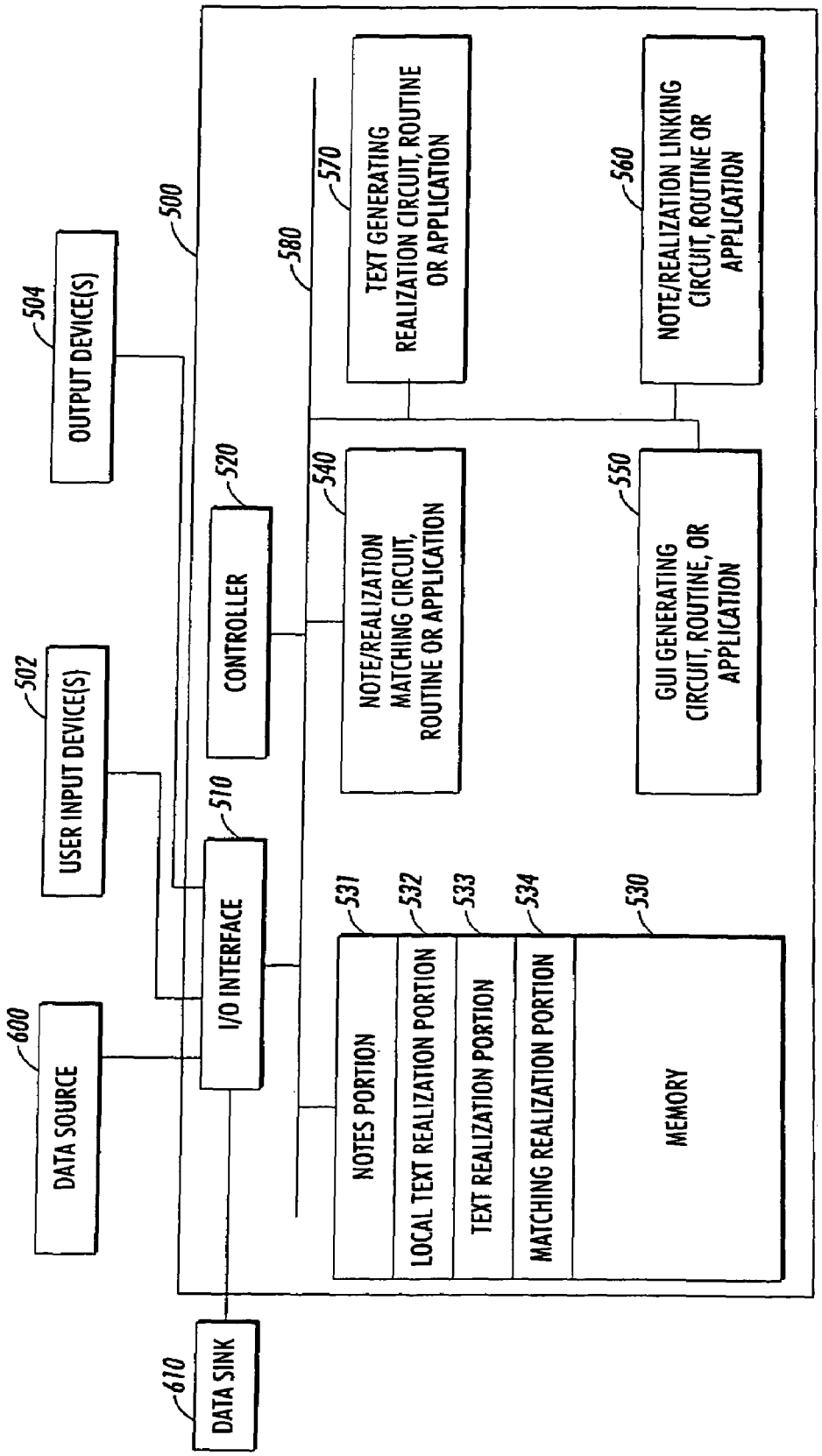
FIG. 10 is a functional block diagram illustrating one exemplary embodiment of a note converting system according to this invention.

FIG. 10 shows one exemplary embodiment of a computing system 500 that converts short notes or keywords to semantically-coherent grammatical text or a global text realization. As shown in FIG. 10, the computing system 500 includes an input/output interface 510, a controller 520, a memory 530, a note/realization matching circuit, routine or application 540, a GUI generating circuit, routine or application 550, a note/realization linking circuit, routine or application 560 and a text generating realization circuit, routine or application 570 interconnected by one or more communication links 580. The communication links 580 can be a data bus, a public switched telephone network, a local or wide area network, an intranet, the Internet, a wireless transmission channel, any other distributing network, or the like. Similarly, the memory 530 can be any structural apparatus for temporarily or indefinitely storing data, programs, and the like, such as RAM, a hard drive and disk, a floppy drive and disk, a writeable or re-writeable optical drive and disk, a flash memory, a ROM, PROM, EPROM, EEPROM, optical ROM disk, CD-ROM, DVD-ROM, or the like.

The memory 530 includes a notes portion 531, a local text realization portion 532, a text realization portion 533, and a matching realization portion 534. A user or operator can supply input data, such as short notes, or make selections by way of a user input device 502, which communicates with the system 500 via the input/output interface 510. The input device 502 can be any type of device which provides an electrical signal to the computer system 500, including, but not limited to, a keyboard, a key, a button, a touch pad, a mouse, a touch screen, and a microphone. The computer system 500 can output signals to one or more output devices 504, such as a display device, printing device, sound device or the like. The computer system 500 can access a data source 600 or send data to a data sink 610 in order to implement various exemplary embodiments of the present invention. In general, the data sink 610 can be any device that is capable of outputting or storing the processed image data generated according to the systems and methods according to this invention, such as a printing device, copying device, display device, sound device, image forming device, facsimile device, memory, or the like.

In accordance with the various exemplary embodiments, once short notes are input via the input device 502, the notes can be stored in the notes portion 531 of the memory 530. The controller 520 can then access the short notes stored in the notes portion 531 for processing. The GUI generating circuit, routine, or application 550 is activated or executed by the controller 520 to display the short notes on output device 504, and to allow the user to edit the short notes. Various other circuits, routines or applications may be used in the system 500, such as, for example, a voice generating and recognizing circuit, routine, or application.

The note/realization matching circuit, routine, or application 540 is activated or executed by the controller 520 to match the short notes stored, for example, in the notes portion 531 with a plurality of semantic expressions and/or local text realizations stored, for example, in the local text realization portion 532. The matching realization portion 534 may temporarily store local text realization associated with each short note and a rank associated with each local text realization. The GUI generating circuit, routine, or application 550 causes the controller 520 to display the short notes, local text realizations associated with each short note, and a global text realization on the output device 504 for the user or operator.

The note/realization linking, routine, or application 560 causes the controller 520 to process the selected local text realizations received from the operator entered through the user input device 502 and input output interface 510. The text realization circuit, routine, or application 570 causes the controller 520 to process the selected local text realizations to provide a global text realization that is then stored in the text realization portion 533 and/or displayed on output device 504.

The systems and methods for converting input data such as short notes to semantically coherent grammatical text or global text realization may be, in various exemplary embodiments, implemented on a programmed general purpose computer. However, the various exemplary embodiments of this invention can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a personal digital assistant (PDA), PLA, FPGA or PAL, or the like. In general, any device or machine, capable of implementing the steps in the flowcharts shown in FIGS. 2-5, can be used.

Although such semantic representations may be used by various exemplary embodiments of the systems and methods according to this invention, the systems and methods according to the various exemplary embodiment are not limited to the types of semantic representations used in the multilingual document authoring system. Other types of semantic representations may be substituted for or added to the semantic representations used in the multilingual document authoring system.

According to various exemplary embodiments of this invention, input data, meaningful inside a restricted community, is converted into semantically-coherent grammatical text, which is preferably adequate for communication to a wider audience, not privy to the conventions used in the restricted community. The semantically-coherent text is also referred to as a global textual realization. An example of input data is short notes. Examples of data input devices include a keyboard, a key, a button, a touch pad, a mouse, and a microphone. Any device capable of converting or sending an electrical signal to the system can be used as an input device. In various exemplary embodiments of the systems and methods according to this invention, the semantically-coherent text is output by an output device. Examples of output devices include display devices, printing devices, sound devices, and the like.

In accordance with various exemplary embodiments of this invention, local text realizations are stored in a storage or memory device. These local text realizations may be aligned with various semantic representations. Various exemplary embodiments of the systems and methods of this invention may thus associate the short notes or other input data with possible semantic structures or representations to generate the global text realization. The semantic representations may also be stored in a storage or memory device in various exemplary embodiments.

Once input data, such as one or more short notes, are received, various exemplary methods and systems perform a fuzzy matching process to identify potential local text realization statements and associate the potential local text realizations with the input data, e.g., short notes. In various exemplary embodiments, the local text realizations are associated with semantic structures. The fuzzy match may be performed using various techniques, such as those discussed in "Document Content Analysis through Fuzzy Inverted Generation" by Aurélien Max and Marc Dymetman (Max and Dymetman). However, the fuzzy match process is not limited to the techniques discussed in Max and Dymetman. The fuzzy match process may take into account synonyms of the input data, text of the input data, and informativeness or descriptiveness of a particular word or abbreviation of the input data to perform the fuzzy match. When more than one local text realization can be associated with a short note, the local text realizations may be ranked.

In accordance with various exemplary embodiments, the systems and methods of this invention, an operator or user is allowed to select a desired local text realization. For example, a user may select a local text realization from a displayed list or menu of local text realizations associated with a short note using an input device. In this list or menu, there is preferably a selection, which allows the user to enter his or her own local text realization. Examples of suitable data input devices for making such a selection include a keyboard, a key, a button, a touch pad, a mouse, a touch screen, and a microphone. In general, any device capable of converting or sending an electrical signal to the system can be an input device for making the selection.

In accordance with various exemplary embodiments of the systems and methods of this invention, a global text realization is generated from the selected local text realizations based on the semantic descriptions of the selected local text realizations.

While this invention has been described in conjunction with the exemplary embodiments outlined above, various alternatives, modifications, variations, improvements, and/or substantial equivalents, whether known or that are or may be presently unforeseen, may become apparent upon reviewing the foregoing disclosure. Accordingly, the exemplary embodiments of the invention, as set forth above, are intended to be illustrative, not limiting. Various changes may be made without departing from the spirit and scope of the invention.

What is claimed is:

1. A method for stenographically processing input data, comprising:
   receiving short note input data;
   using a semantic grammar to generate semantic structure;
   producing with a first realization grammar a plurality of local text realizations from the semantic structure;
   matching the short note input data with ones of the plurality of local text realizations to define a final semantic structure;
   producing with a second realization grammar global text realizations from the final semantic structure.

2. The method of claim 1, further comprising outputting the global text realization to an output device.

3. The method of claim 2, wherein outputting the global text realization comprises outputting the global text realization to at least one of a printing device, a display device, and a sound device.

4. The method of claim 1, wherein the short notes are semantic abbreviations.

5. The method of claim 1, wherein matching the short note input data with ones of the plurality of local text realizations to define a final semantic structure comprises:
   performing a fuzzy match between the plurality of local text realizations and the short notes to provide a local text realization associated with each short note; and
   defining the final semantic structure based on the local text realizations.

6. The method of claim 1, wherein matching the short note input data with ones of the plurality of local text realizations to define a final semantic structure comprises:
   performing a fuzzy match between the plurality of local text realizations and the short notes to provide at least one local text realization associated with each short note;
   selecting one of the local text realizations associated with each short note; and
   defining the final semantic structure based on the selected local text realizations.

7. The method of claim 6, wherein performing a fuzzy match comprises assigning a rank to each local text realization associated with each short note.

8. The method of claim 1, wherein matching the short note input data with ones of the plurality of local text realizations to define a final semantic structure comprises:
   performing a fuzzy match between the plurality of local text realizations and the short notes to provide at least one local text realization associated with each short note;
   displaying the short notes and said at least one local text realization associated with each short note;
   selecting one of the local text realizations associated with each short note; and defining the final semantic structure based on the selected local text realizations.

9. The method of claim 8, wherein performing a fuzzy match comprises assigning a rank to each local text realization associated with each short note.

10. The method of claim 6, wherein performing a fuzzy match comprises:
   determining a descriptor for each short note;
   providing descriptors for each local text realization;
   determining a fuzzy similarity measure between the descriptors for short notes and the descriptors for local text realizations; and
   ranking local text realizations based on the fuzzy similarity measure between the descriptors of the short notes and the descriptors of the local text realizations.

11. A system for stenographically processing input data, comprising:
   an input device which receives short note input data;
   a semantic grammar generator which uses a semantic grammar to generate semantic structure;
   a local text realization generator which produces with a first realization grammar a plurality of local text realizations from the semantic structure;
   a processor that matches the short note input data with the plurality of local text realizations to define a final semantic structure; and
   the processor that produces with a second realization grammar global text realizations from the final semantic structure.

12. The system of claim 11, further comprising an out device which outputs the global text realizations.

13. The system of claim 12, wherein the output device comprises one of a printing device, a display device, and a sound device.

14. The system of claim 11, wherein the short notes are semantic abbreviations.

15. The system of claim 11, wherein the processor matches the short note input data with the plurality of local text realizations by performing a fuzzy match between the plurality of local text realizations and the short notes to provide a local text realization associated with each short not.

16. The system of claim 15, wherein performing the fuzzy match comprises assigning a rank to each local text realization associated with each short note.

17. The system of claim 15, further comprising an output device which displays the short notes and said at least one local text realization associated with each short note.

18. The system of claim 17, wherein the input device or another input device receives a selection of one of the local text realizations associated with each short note.

19. A computer program product, comprising:
   a computer usable medium having computer readable program code embodied therein for converting input data into a global text realization, wherein said computer readable instructions comprise:
   a computer readable program code for causing a computer to receive input data;
   a computer readable program code for causing a computer to use semantic grammar to generate semantic structure;
   a computer readable program code for producing with a first realization grammar a plurality of local text realizations from the semantic structure;
   a computer readable program code for matching the input data with ones of the plurality of local text realizations to define a final semantic structure;
   a computer readable program code for producing with a second realization grammar the global text realization from the final semantic structure; and
   a computer readable program code for causing a computer to output the global text realization.

20. A computer program product, comprising:
   a computer usable medium having computer readable program code embodied therein for converting short notes into a global text realization, wherein said computer readable instructions comprise:
   a computer readable program code for causing a computer to perform a fuzzy match between local text realizations and short notes to provide at least one local text realization in association with each short note; and
   a computer readable program code for causing the computer to generate a global text realization for each short note from associated local text realization selected by an operator.

21. A system for converting short notes into a global text realization comprising:
   means for inputting short notes;
   means for using semantic grammar to generate semantic structure;
   means for producing with a first realization grammar a plurality of local text realizations from the semantic structure;
   means for matching the short note input data with ones of the plurality of local text realizations to define a final semantic structure;
   means for producing with a second realization grammar the global text realization from the final semantic structure; and
   means for outputting the global text realization.

* * * * *